US012469991B2

United States Patent
Bardella et al.

(10) Patent No.: US 12,469,991 B2
(45) Date of Patent: Nov. 11, 2025

(54) TWINAX ROUTING FOR TIGHT BEND RADIUS

(71) Applicant: Molex, LLC, Lisle, IL (US)

(72) Inventors: Gianni Ryan Bardella, Maumelle, AR (US); Michael McGee, Maumelle, AR (US)

(73) Assignee: Molex, LLC, Lisle, IL (US)

( * ) Notice: Subject to any disclaimer, the term of this patent is extended or adjusted under 35 U.S.C. 154(b) by 249 days.

(21) Appl. No.: 18/333,193

(22) Filed: Jun. 12, 2023

(65) Prior Publication Data

US 2023/0402772 A1  Dec. 14, 2023

Related U.S. Application Data

(60) Provisional application No. 63/350,869, filed on Jun. 10, 2022.

(51) Int. Cl.
| | |
|---|---|
| *H01R 9/03* | (2006.01) |
| *H01R 9/053* | (2006.01) |
| *H01R 13/6591* | (2011.01) |
| *H01B 7/08* | (2006.01) |

(52) U.S. Cl.
CPC .............. *H01R 9/031* (2013.01); *H01R 9/053* (2013.01); *H01R 13/65914* (2020.08); *H01B 7/0807* (2013.01)

(58) Field of Classification Search
CPC .............. H01R 9/031; H01R 13/65914; H01R 13/6592; H01R 19/053; H01B 7/0807
See application file for complete search history.

(56) References Cited

U.S. PATENT DOCUMENTS

| | | | | |
|---|---|---|---|---|
| 6,039,611 | A | * 3/2000 | Yang | H01R 4/023 439/942 |
| 2016/0035461 | A1 | 2/2016 | Kumada | |

FOREIGN PATENT DOCUMENTS

| | | |
|---|---|---|
| JP | 2003329887 A | 11/2003 |
| JP | 2018503228 A | 2/2018 |
| KR | 20120002772 U | 4/2012 |
| KR | 20140001831 A | 1/2014 |
| TW | 202114302 A | 4/2021 |

* cited by examiner

*Primary Examiner* — Renee S Luebke
*Assistant Examiner* — Paul D Baillargeon

(57) ABSTRACT

A twinax cable assembly comprises a cable lacing section between the assembly end sections. The cable assembly includes twinax cable sets of twinax cables. Each cable includes a pair of conductors spaced apart in a lateral direction. Each of the cable sets has connector ends where each of the cables in the cable sets connects to a terminal component. A tie bar is mounted on one end and another tie bar is mounted on the other end between the lacing section and the ends of the cables. The cables in each cable set lace through the other cable sets with the pair of conductors in each of the twinax cables substantially aligned in the lateral direction such that when the cable assembly bends substantially around a bend axis in the lateral direction the pairs of conductors in each of the twinax cables remain substantially aligned in the lateral direction.

21 Claims, 6 Drawing Sheets

TWINAX ROUTING FOR TIGHT BEND RADIUS

RELATED APPLICATIONS

This application claims priority to U.S. Provisional Application No. 63/350,869 filed on Jun. 10, 2022, which is incorporated herein by reference in its entirety.

BACKGROUND ART

Twinaxial cabling, or "Twinax", is a type of electrical cable similar to coaxial cable, but with two inner conductors instead of one. Twinax is becoming common in modern very-short-range high-speed differential signaling applications. Signals are sent differentially over the wires at, for example, 1 Mbit/s (1 μs/bit). Twinax is typically used in short-range, high-speed applications and twinax cables are preferably designed to meet established signal integrity performance standards.

Twinax cables may be assembled in bundles that terminate at connectors at opposite ends of the cable bundle. A cross-section of the ends of the cable bundles may form a two-dimensional array where each cable end terminates on a printed circuit board disposed in the connector. The printed circuit board may be encased in a connector shell with conductors on an edge of the printed circuit board, or metallic contacts exposed on the end of the connector, with the connector connecting to a receptacle configured to mate with the connector. In some installations, multiple bundles of cables each having connectors may be connected to a backplane on computer components.

Each cable bundle or cable assembly may need to be bent in tight spaces such that the bend may be a tight bend. A sufficiently tight bend may affect the signal integrity of the signals being communicated in the twinax cables. The bend may be sufficient so as to cause the cable to fail the performance standards for signal integrity at bends. For example, discrete twinax cable assemblies may need to meet a signal integrity performance standard for bends that are less than 5 times the cable outside diameter.

SUMMARY

In view of the above, a twinax cable assembly is provided to permit tight bends without significant degradation of signal integrity. In one aspect, a twinax cable assembly includes a first assembly end section, a second assembly end section, and a cable lacing section between the first and second assembly end sections. A plurality of twinax cable sets includes a plurality of twinax cables. Each twinax cable includes a pair of conductors. The twinax cables in the twinax cable sets are arranged so that the conductor pairs are spaced apart in a lateral direction. Each of the twinax cable sets have opposite cable end sections corresponding to the first and second assembly end sections, and connector ends where each of the twinax cables in the twinax cable sets connect to a terminal component. A first tie bar is mounted on the first assembly end section and a second tie bar is mounted on the second assembly end section between the cable lacing section and the connector ends of the twinax cables. The tie bars are configured to orient the plurality of twinax cable sets such that each twinax cable set is stacked on each next twinax cable set substantially parallel to each other at the first and second assembly end sections. The twinax cables in each twinax cable set lace through the other twinax cable sets with the pair of conductors in each of the twinax cables substantially aligned in the lateral direction. When the twinax cable assembly bends substantially around a bend axis in the lateral direction, the pairs of conductors in each of the twinax cables remain substantially aligned in the lateral direction.

In another aspect, the twinax cable assembly includes a plurality of binders configured to wrap around the cable end sections of each of the plurality of twinax cable sets between the cable lacing section and the connector ends of each twinax cable set. Each binder is configured to maintain the pair of conductors in each of the twinax cables in the end section of each twinax cable set substantially aligned in the lateral direction such that the twinax cable sets bend substantially around the bend axis extending in the lateral direction.

DETAILED DESCRIPTION OF THE PREFERRED EMBODIMENTS

Figure 1:
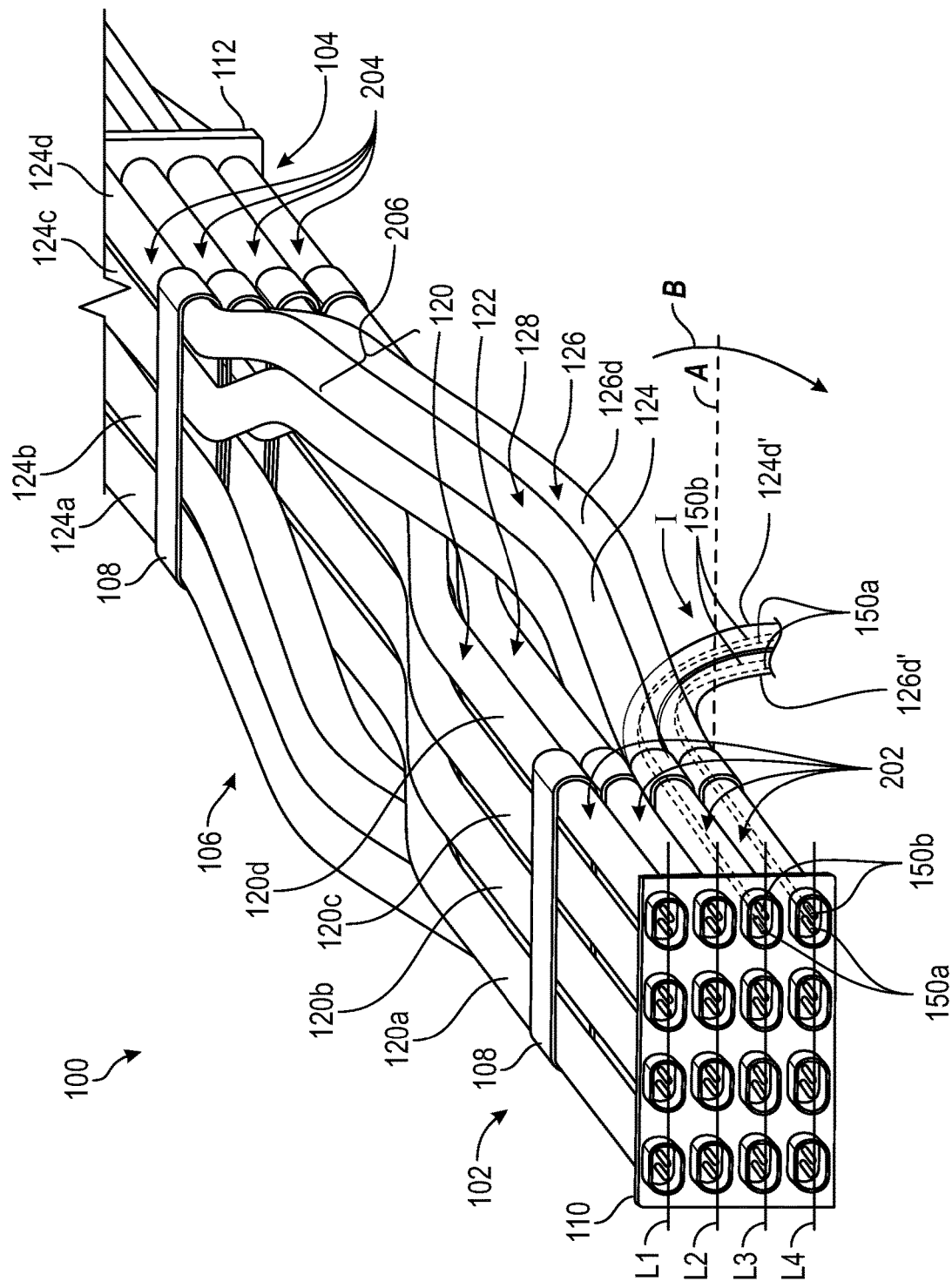
FIG. 1 is an example embodiment of a twinax cable assembly configured for routing with tight bends without substantial degradation of signal integrity.

Example implementations of a twinax cable assembly described below address the possible degradation of signal integrity when twinax cable assemblies are bent, particularly near a connection to an electrical component. As is well-known in the art, twinax cables include a pair of conductors surrounded by an insulating material within a cable covering or sheath. Twinax cables are designed to benefit from the same structural characteristics that improve signal integrity in coaxial cables in which a signal conductor extends through the length of the cable. In particular, twinax cables may be surrounded as mentioned above with selected insulating materials including plastic such as polyethylene, foam, and other suitable dielectric materials having sufficient strength and flexibility to keep the conductors separated within the cable and to bend with the bending of the cable assembly.

One cause of the degradation of signal integrity at tight bends of twinax cable assemblies occurs when a cable bends such that the conductor pair in the cable is aligned perpendicular to the axis around which the cable is bent. In such a bend, one cable, the outside cable, is disposed further from a bending axis around which the cable is bent than the inside cable disposed closer to the bending axis. Such a bend has been shown to cause a lengthening in the timing of the signal traveling along the outside conductor relative to the timing of the signal traveling along the inside conductor. Such a lengthening in the timing between the differential signals degrades the signal integrity and can compromise the ability of the cable to perform within the signal integrity specifications typically specified for cable bends.

Cables are typically required to maintain adequate signal integrity around a bend having an effective bend radius that is greater than or equal to 5× the outer diameter of the cable. An effective bend radius of less than 5× the outer diameter of the cable is becoming the preferred specification for a bend radius. Twinax cable assemblies typically include multiple cables formed into a bundle. The twinax cables terminate at connectors that plug into electronic equipment, such as backplane connectors of servers and other computing equipment connectors. In example implementations described below, multiple twinax cables may be arranged as twinax cable sets with the cables disposed side by side with the conductor pairs aligned along a lateral direction. The twinax cables are typically terminated on a printed circuit board or other structure in a connector component such that the conductor pairs connect to a planar surface along the same lateral direction. Example implementations of twinax cable assemblies configured for routing with tight bends may be formed by disposing the twinax cable sets to form levels stacked at the cable ends and lacing, weaving, or routing the twinax cables through each other as the cable assembly extends to the other end. The lacing between end sections of the cable assembly permits the individual cables to maintain the conductor pairs aligned along a lateral direction in which the cables are disposed. In this manner, cables at tight bends have their conductors aligned along the lateral direction so that both conductors are equidistant to the bending axis thereby minimizing the negative effects of bending on signal integrity.

The end sections of the twinax cable assemblies in example implementations may be secured by a tie bar that distributes the cables before the cables connect to the connector component(s). The twinax cable sets may be arranged along a two-dimensional cross-section of the cable assembly. The conductor pairs align in a lateral direction corresponding to each twinax cable set and the multiple twinax cable sets are stacked such that the aligned conductor pairs are in parallel with one another. In example implementations, a binder, such as for example, a binding tape, may be used to keep the individual twinax cables in a twinax cable set disposed along a lateral direction with the conductor pairs aligned in the lateral direction.

Figure 2A:
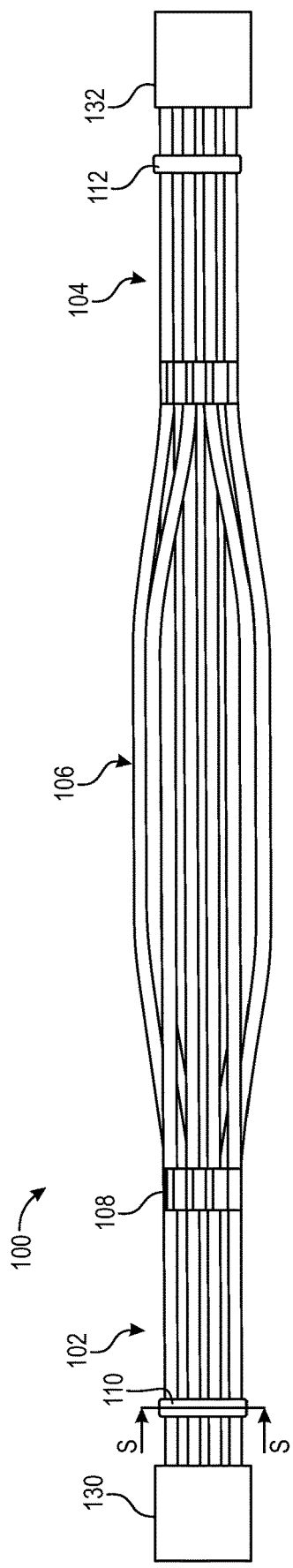
FIG. 2A is a top view of the twinax cable assembly of FIG. 1.
Figure 2B:
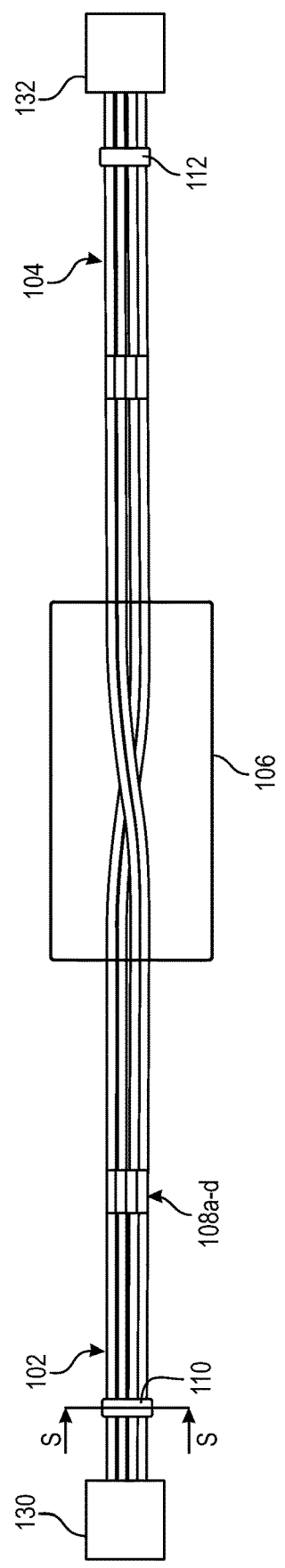
FIG. 2B is a side view of the twinax cable assembly of FIG. 1.

FIG. 1 is an example embodiment of a twinax cable assembly 100 configured for routing with tight bends without substantial degradation of signal integrity. FIGS. 2A and 2B are top and side views, respectively, of the twinax cable assembly of FIG. 1. Referring to FIGS. 1 and 2A-2B, the example twinax cable assembly includes a first assembly end section 102, a second assembly end section 104 opposite the first assembly end section 102, and a cable assembly lacing section 106 between the first assembly end section 102 and the second assembly end section 104. The twinax cable assembly 100 includes a plurality of twinax cable sets 120, 122, 124, and 126 having a plurality of twinax cables 120a-d, 122a-d, 124a-d, and 126a-d, each comprising a pair of conductors 150a and 150b spaced apart in a lateral direction depicted for each twinax cable set 120, 122, 124, and 126 by parallel lines L1-L4, respectively. The conductor pairs 150a and 150b within each twinax cable are surrounded by an insulating material. Each of the twinax cable sets 120, 122, 124, 126 has opposite cable set end sections 202 and 204 at the first and second assembly end sections 102 and 104, a middle section 206 within the cable assembly lacing section 106 between the cable set end sections 202 and 204, and connector ends where each of the twinax cables in the twinax cable sets connect to terminal components 130 and 132 (shown schematically in FIGS. 2A and 2B and described in more detail as a printed circuit board in FIG. 3 below).

The example twinax cable assembly 100 in FIGS. 1 and 2A-2B includes a first tie bar 110 depicted in cross-section (shown as cross-section S-S in FIGS. 2A and 2B) to also depict a cross-section of the twinax cable assembly 100. The first tie bar 110 is mounted on the first assembly end section 102 and a second tie bar 112 mounted on the second assembly end section 104. Each tie bar 110, 112 is disposed between the cable assembly lacing section 106 and the terminal components 130, 132. Each tie bar 110, 112 is configured to orient the plurality of twinax cable sets 120, 122, 124, 126 such that each twinax cable set 120, 122, 124, 126 is stacked on each next twinax cable set 120, 122, 124, 126 substantially parallel to each other at the first and second assembly end sections 102, 104.

The twinax cable sets 120, 122, 124, and 126 are arranged so that at least one of the twinax cable sets 120, 122, 124, or 126 is laced with at least one of the other twinax cable sets 120, 122, 124, or 126 in the cable lacing section of the twinax cable assembly 100. As an example, twinax cable set 120 laces with twinax cable set 126 in the example implementation shown in FIGS. 1, 2A and 2B. The lacing of the twinax cable sets 120, 122, 124, 126 is conducted during assembly of the twinax cable assembly 100 so as to maintain the pairs of conductors 150 in each of the twinax cables 120a-d, 122a-d, 124a-d, and 126a-d substantially aligned in the lateral direction such that when the twinax cable assembly 100 bends (at bend B around axis A in FIG. 1) substantially around a bend axis A extending in the lateral direction, the pairs of conductors in each of the twinax cables remain substantially aligned in the lateral direction. The alignment of the conductor pairs 150a and 150b is shown as remaining in the lateral direction as the twinax cables 126d and 124d bend in image I in FIG. 1. The lacing of the twinax cables in the cable assembly lacing section 106 of the twinax cable assembly 100 helps ensure that the conductor pairs 150 are maintained in alignment such that each conductor in a pair is equidistant to the bend axis A.

It is noted that the lacing of the twinax cable sets 120, 122, 124, and 126 may be determined by how the cables terminate on opposite ends of the cable assembly 100. As noted above, the cable sets 120, 122, 124, and 126 are stacked at the opposite assembly end section 102, 104. The twinax cables in each twinax cable set 120, 122, 124, and 126 may terminate at the terminal components 130, 132 in a manner that changes the stacking order of the twinax cable sets 120, 122, 124, 126. The lacing of the cables with cables from different cable sets may be configured to ensure that each cable terminates at each terminal component 130, 132 such that the signals conducted in the cables are communicated as intended. The stacking of the cable sets is described further with reference to FIGS. 3-5.

The alignment of the conductor pairs 150a and 150b in each twinax cable 120a-d, 122a-d, 124a-d, and 126a-d may be further maintained by applying a binder 108 to each twinax cable set 120, 122, 124, 126. The binder 108 may be wrapped around the cable set end sections 202, 204 of each of the plurality of twinax cable sets between the cable assembly lacing section 106 and the connector ends of each twinax cable set 120, 122, 124, 126. Each binder 108 is configured to further ensure that the twinax cable sets 120, 122, 124, 126 bend substantially around the bend axis A extending in the lateral direction with all of the conductor pairs substantially aligned laterally. The binders 108 may be any suitable tape or strap-like material, such as, for example, duct tape, packing tape, or a similar alternative.

The twinax cables in the twinax cable assembly 100 may be any suitable twinax cable having a pair of conductors 150. The twinax cables may be surrounded by a dielectric material to keep the conductors apart while providing some flexibility to permit bending. The conductor pairs and insulation may also be surrounded by a shielding material, such as a metal foil or braided metal in a film-like arrangement. In some embodiments, the twinax cables include a pair of ground wires disposed on opposite sides of the pair of conductors as described in more detail below with reference to FIG. 5. The pair of conductors 150 and pair of ground wires may be spaced apart and aligned in the lateral direction. In some examples, the ground, or drain, wires may not be aligned with the conductor pairs 150, and in some cases, a cable shield, or foil layer, may be connected to function as a drain.

Figure 3:
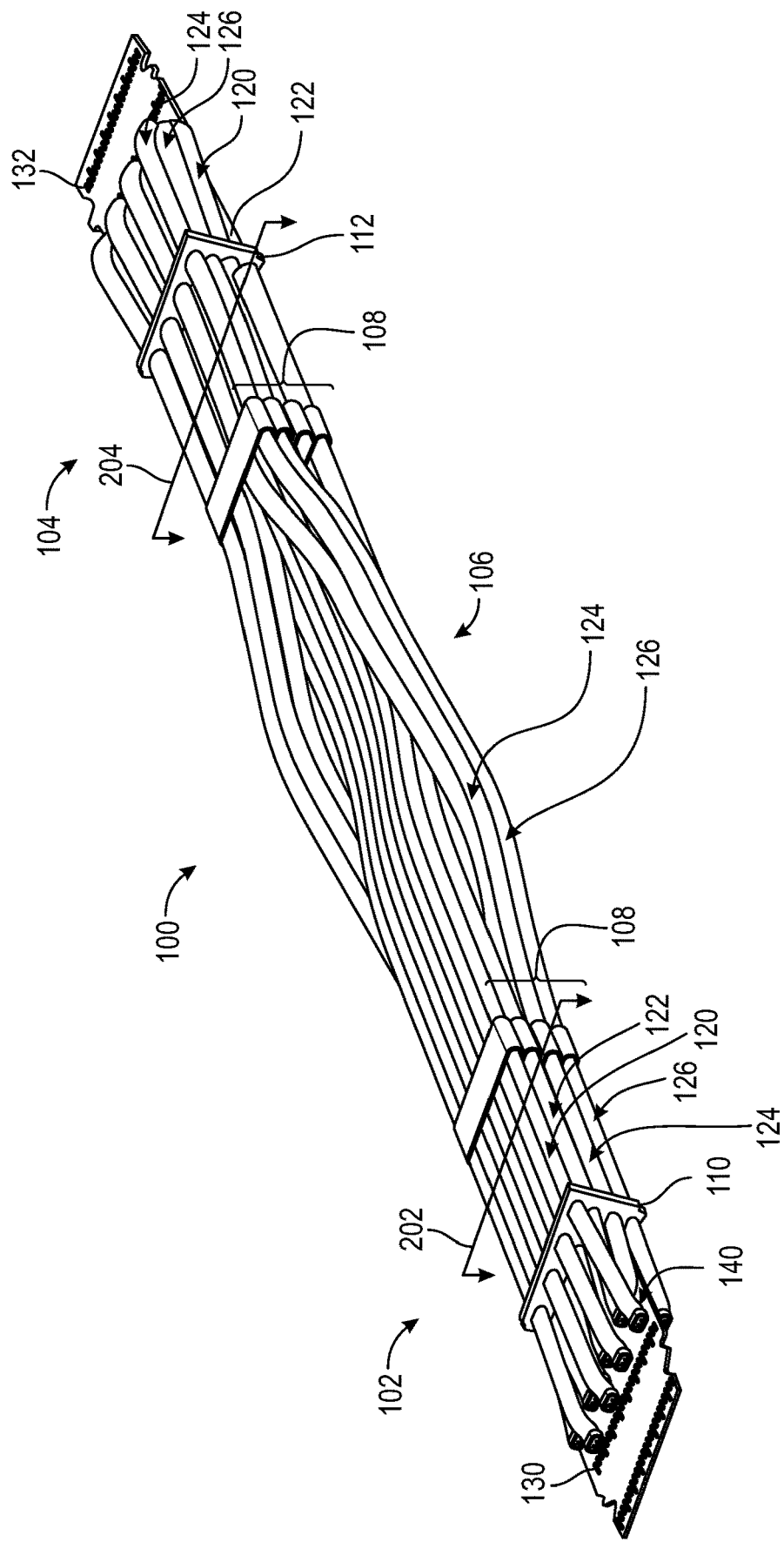
FIG. 3 is a top perspective view of the twinax cable assembly of FIG. 1 connected to connector printed circuit boards on opposite ends.
Figure 4:
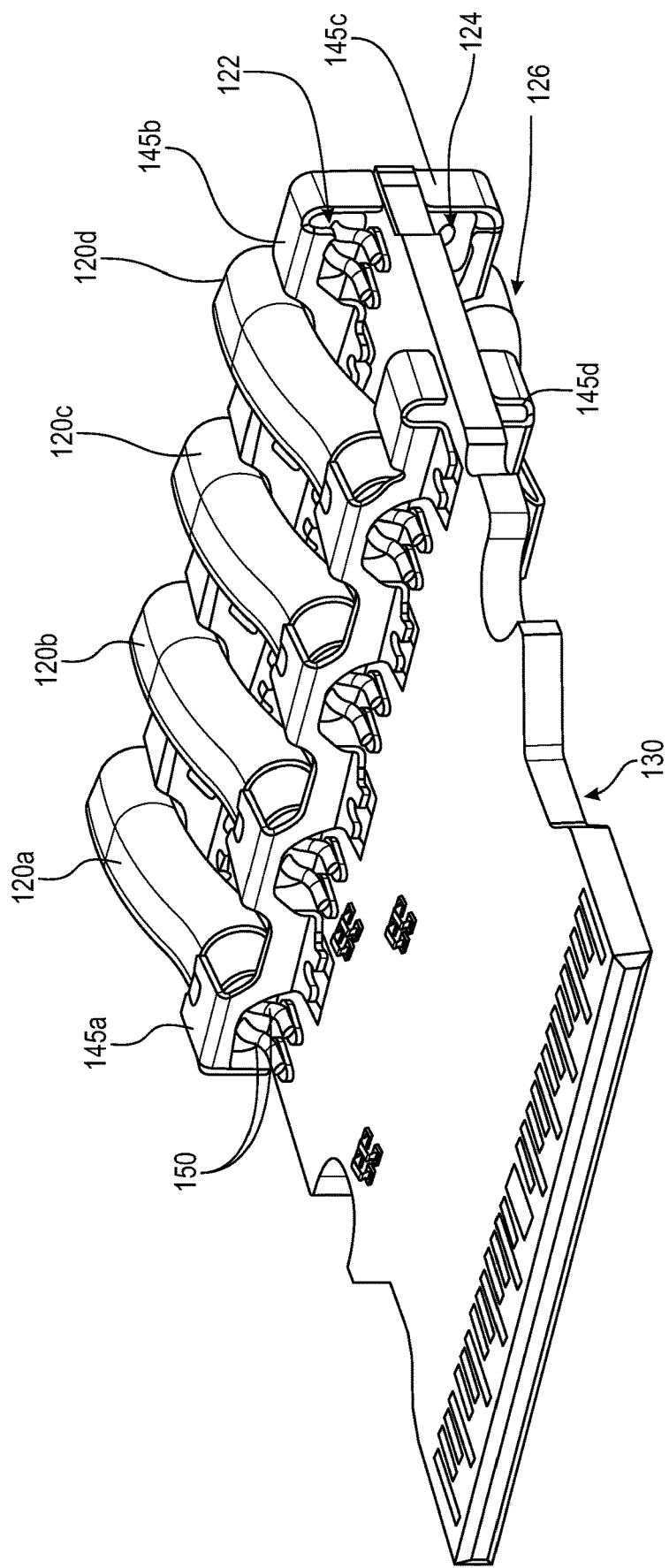
FIG. 4 is a close-up view of a connector printed circuit board at one end of the twinax cable assembly in FIG. 3.
Figure 5:
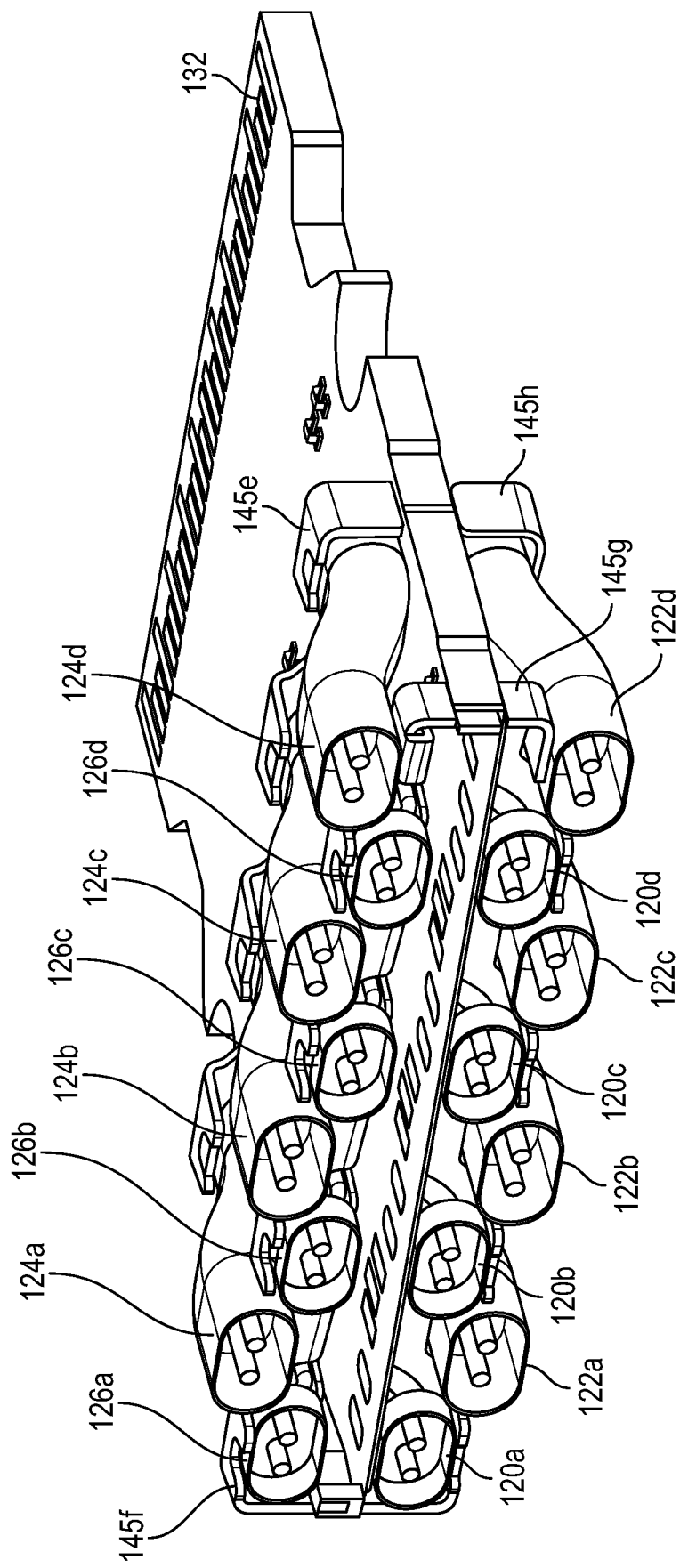
FIG. 5 is a close-up view of the connector printed circuit board at an opposite end of the twinax cable assembly in FIG. 3 viewed from behind the cable connections to the connector printed circuit board.

FIG. 3 is a top perspective view of the twinax cable assembly 100 of FIG. 1 connected to connector printed circuit boards 130 and 132 on opposite ends of the twinax cable assembly 100. FIG. 4 is a close-up view of a connector printed circuit board 130 at one assembly end section 102 of the twinax cable assembly 100 in FIG. 3. FIG. 5 is a close-up view of the connector printed circuit board 132 at an opposite assembly end section 104 of the twinax cable assembly 100 in FIG. 3 viewed from behind the cable connections to the connector printed circuit board.

Referring to FIGS. 3-5, the twinax cable assembly 100 may be any suitable length and may typically be covered by a sheath or a suitable material that keeps the twinax cables encased for convenience in handling. The printed circuit boards 130 and 132 may be enclosed in connector shell components as described below with reference to FIG. 6. The twinax cable sets 120, 122, 124, and 126 may be stacked as shown in FIG. 3 in a first order 120-122-124-126 at the first cable set end section 202 to connect to the first printed circuit board 130. As the cable assembly 100 extends to the opposite assembly end section 104, through the lacing section 106, the stacking order may change. As shown in the figures, the stacking order at the second cable set end section 204 is 124-126-120-122 from top to bottom.

The stacking order may be determined by the type of signal being conducted by the conductor pairs. For example, a signal may be transmitted on one of the twinax cables at the first end. The conductor pair in the twinax cable would be connected to a transmit terminal on the printed circuit board 130 at the first cable set end section 202 of the twinax cable and to a receive terminal on the printed circuit board 132 at the second end 204 of the twinax cable. It is noted that while the cable sets 120, 122, 124, 126 are formed so that the same twinax cables form each twinax cable set 120, 122, 124, 126 at both ends, it is possible in some embodiments for the twinax cables to cross within the lacing section to different twinax cable sets at the opposite cable set end sections 202, 204. The twinax cables are maintained in the same twinax cable sets from one cable end section 202 to the other cable set end section 204 for purposes of clarity in describing the example implementations. Example implementations of the twinax cable assembly having a lacing section 106 advantageously use the lacing to maintain the lateral alignment of the conductor pairs in each twinax cable regardless of how the twinax cables are routed between the first cable set end section 202 and the second cable set end section 204 of the twinax cable assembly 100.

The lacing section 106 of the twinax cable assembly 100 includes one or more of the twinax cables in each twinax cable set laced through the other twinax cable sets. The twinax cables may be separated individually and laced through the twinax cable sets, or in pairs of twinax cables, or in other groups. The twinax cables may also be laced individually or in groups at random. The example cable assembly 100 shown in FIG. 3 laces the twinax cables in pairs. That is, pairs of twinax cables in each twinax cable set are separated and laced through the other twinax cable sets.

The stacking order of the twinax cable sets may be changed through the lacing section 106 individually such that the twinax cable sets are in a different order at the opposite cable set end sections 202, 204. The twinax cable assembly 100 in FIG. 3 depicts the twinax cable sets paired so that the stacking order of the pairs of twinax cable sets is reversed at opposite assembly end sections 102, 104 of the twinax cable assembly 100.

The twinax cables 120*a-d*, 122*a-d*, 124*a-d*, 126*a-d* connect to the first printed circuit board 130 at the first assembly end section 102 of the cable assembly 100. Each end of the twinax cables may be fixed to the printed circuit board 130 by a bracket 145. A first bracket 145*a* secures the ends of twinax cable 120*a-d*. A second bracket 145*b* secures the ends of twinax cable 122*a-d*. A third bracket 145*c* secures the ends of twinax cable 124*a-d*. A fourth bracket 145*d* secures the ends of twinax cable 126*a-d*. The conductor pairs 150 in each twinax cable 120*a-d*, 122*a-d*, 124*a-d*, 126*a-d* may be soldered, or otherwise functionally secured to the surface of the printed circuit board 130 to electrically connect to a suitable trace etched on the printed circuit board 130. The connections of the conductor pairs 150 may be connected to the printed circuit board 130 in rows according to the stacking order of the twinax cable sets 120, 122, 124, 126.

The twinax cables 120*a-d*, 122*a-d*, 124*a-d*, 126*a-d* connect to the second printed circuit board 132 at the second assembly end section 104 of the cable assembly 100. Each end of the twinax cables may be fixed to the printed circuit board 132 by a bracket 145 similar to that of the brackets 145*a-d* in FIG. 4. A first bracket 145*e* secures the ends of twinax cable 124*a-d*. A second bracket 145*f* secures the ends of twinax cable 126*a-d*. A third bracket 145*g* secures the ends of twinax cable 120*a-d*. A fourth bracket 145*h* secures the ends of twinax cable 122*a-d*. The conductor pairs 150 in each twinax cable 120*a-d*, 122*a-d*, 124*a-d*, 126*a-d* may be soldered, or otherwise functionally secured to the surface of the printed circuit board 130 to electrically connect to a suitable trace etched on the printed circuit board 132. The connections of the conductor pairs 150 may be connected to the printed circuit board 132 in rows according to the stacking order of the twinax cable sets 120, 122, 124, 126.

It is noted that the example twinax cable assembly 100 described with reference to FIGS. 3-5 include terminal connections to printed circuit boards 130, 132. It is noted that other example twinax cable assembly 100 implementations may terminate at different structures. Printed circuit boards 130, 132 comprise but one type of terminal structure illustrated here for purposes of providing a clear description. Other suitable connection structures may be used as well.

Figure 6:
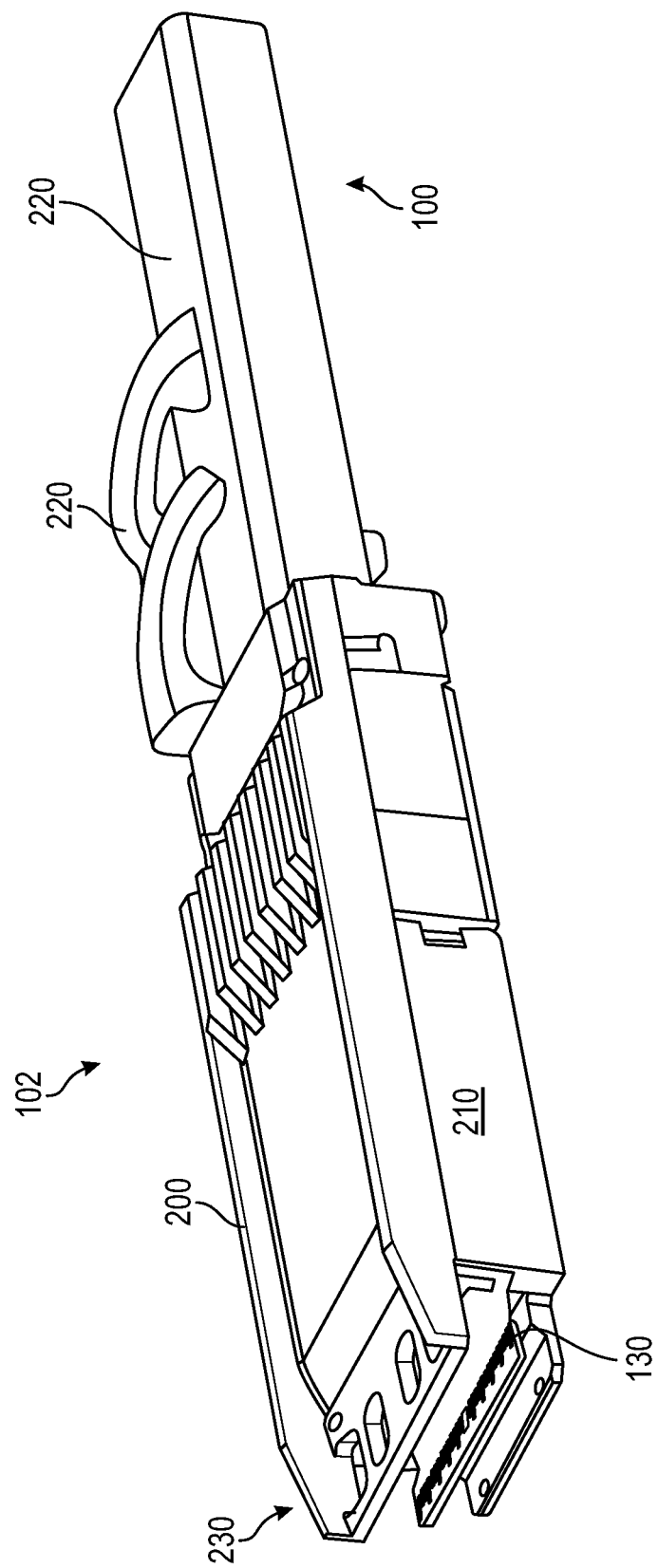
FIG. 6 is a connector end of the twinax cable assembly with a connector shell covering the connector printed circuit board.

FIG. 6 is a connector 200 at one assembly end section 102 of the twinax cable assembly 100. The connector 200 has a connector shell 210 covering the connector printed circuit board 130. The twinax cable assembly 100 is shown covered with a cable cover or sheath 220. The connector 200 may include a suitable mating structure 230 that mates with a corresponding structure on a receiving connector. The receiving connector may be a part of an electronic component configured to receive the connector 200 and the signals communicated on the twinax cable assembly 100.

It is noted that the example implementations of the twinax cable sets 120, 122, 124, 126 described in this disclosure each include four twinax cables. However, other example implementations may include any other suitable number of twinax cables. In addition, four twinax cable sets 120, 122, 124, 126 form the example twinax cable assemblies 100 described herein, however, other example implementations may include any suitable number of twinax cable sets. In addition, example implementations may include a first plurality of twinax cable sets having one number of twinax cables, and through lacing, come together at the other end with a second plurality of cable sets with a different number of twinax cables in each twinax cable set.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

What is claimed is:

1. A twinax cable assembly comprising:
a first assembly end section, a second assembly end section, and a cable lacing section between the first and second assembly end sections;
a plurality of twinax cable sets, each comprising a plurality of twinax cables, each twinax cable comprising a pair of conductors spaced apart in a lateral direction and surrounded by an insulating material, each of the twinax cable sets having opposite cable end sections corresponding to the first and second assembly end sections, and connector ends where each of the twinax cables in the twinax cable sets connect to a terminal component; and
a first tie bar mounted on the first assembly end section and a second tie bar mounted on the second assembly end section between the cable lacing section and the connector ends of the twinax cables, the tie bars configured to orient the plurality of twinax cable sets such that each twinax cable set is stacked on each next twinax cable set; and
where the twinax cables in at least one twinax cable set lace with at least one other twinax cable set with the pair of conductors in each of the twinax cables substantially aligned in the lateral direction such that when the twinax cable assembly bends substantially around a bend axis in the lateral direction the pairs of conductors in each of the twinax cables remain substantially aligned in the lateral direction.

2. The twinax cable assembly of claim 1 further comprising:
a plurality of binders configured to wrap around the cable end sections of each of the plurality of twinax cable sets between the cable lacing section and the connector ends of each twinax cable set, each binder configured to maintain the pair of conductors in each of the twinax cables in the end section of each twinax cable set substantially aligned in the lateral direction such that the twinax cable sets bend substantially around the bend axis extending in the lateral direction.

3. The twinax cable assembly of claim 1 where each twinax cable includes a pair of ground wires disposed on opposite sides of the pair of conductors, the pair of conductors and pair of ground wires spaced apart in the lateral direction.

4. The twinax cable assembly of claim 1 where the pair of conductors at the connector ends of each twinax cable set connect to a printed circuit board in a row of connections substantially in parallel with the row of connections at which the connector ends of a next twinax cable set connects to the printed circuit board.

5. The twinax cable assembly of claim 1 where the twinax cable sets are stacked in a first order at the first assembly end section and in a second order in reverse of the first order at the second assembly end section.

6. The twinax cable assembly of claim 5 where:
a first plurality of the twinax cable sets connects to a top side of a first printed circuit board at the first assembly end section of the twinax cable assembly;
a second plurality of the twinax cable sets connects to a bottom side of the first printed circuit board at the first assembly end section of the twinax cable assembly;
the first plurality of the twinax cable sets laces through the second plurality of cable sets towards the second assembly end section of the twinax cable assembly such that:
the first plurality of twinax cable sets connects to a bottom side of a second printed circuit board at the second assembly end section of the twinax cable assembly; and
the second plurality of twinax cable sets connects to a top side of the second printed circuit board at the second assembly end section of the twinax cable assembly.

7. The twinax cable assembly of claim 1 where the plurality of twinax cable sets are configured in pairs of twinax cable sets in a first order of pairs at the first assembly end section and in a second order of pairs at the second assembly end section.

8. The twinax cable assembly of claim 7 where the second order of pairs is in reverse order of the first order of pairs.

9. The twinax cable assembly of claim 1 where:
at the first assembly end section, the plurality of twinax cable sets are stacked in a first order of levels of twinax cable sets, and at the second assembly end section, the plurality of twinax cable sets are stacked in a second order of levels of twinax cable sets, and where:
one of the twinax cable sets at one of the levels of the first order at the first assembly end section laces through the other twinax cable sets by separating twinax cables from other twinax cables in the one of the twinax cable sets as the one of the twinax cable sets at the one level extends into the lacing section of the twinax cable assembly, and the separated twinax cables re-form the one of the twinax cable sets at a different level of the second order at the second assembly end section.

10. The twinax cable assembly of claim 1 where:
at the first assembly end section, the plurality of twinax cable sets are stacked in a first order of levels of pairs of stacked twinax cable sets, and at the second assembly end section, the plurality of twinax cable sets are stacked in a second order of levels of pairs of stacked twinax cable sets, and where:
a first pair of stacked twinax cable sets at one of the levels of the first order at the first assembly end section laces through the other twinax cable sets by separating twinax cables from other twinax cables in each twinax cable set in the first pair of stacked twinax cable sets as the first pair of stacked twinax cable sets at the one of the levels extends into the lacing section of the twinax cable assembly, and the separated twinax cables re-form the first pair of stacked twinax cable sets at a different level of the second order at the second assembly end section.

11. The twinax cable assembly of claim 1 where the first assembly end section of the twinax cable assembly terminates at connections to a first printed circuit board and the second assembly end section terminates at connections to a second printed circuit board.

12. The twinax cable assembly of claim 11 where the first printed circuit board and the second printed circuit board are each enclosed in first and second connector housings configured to mate with corresponding connectors.

13. The twinax cable assembly of claim 12 where at least one of the corresponding connectors to which the first connector housing and the second connector housing are configured to mate is mounted on a backplane of a component housing.

14. The twinax cable assembly of claim 13 where when the twinax cable assembly bends near the first or second assembly end section when connected to the backplane of the component housing, each twinax cable in each twinax cable row bends about the lateral direction along which the conductor pairs in the twinax cables are substantially aligned.

15. The twinax cable assembly of claim 12 where each of the first and second connector housings include a backshell portion configured to receive the conductor pairs in the twinax cables.

16. A method of assembling a twinax cable assembly comprising:
   selecting a first plurality of twinax cables from a plurality of twinax cables each having a pair of conductors;
   forming a first twinax cable set by positioning each twinax cable in the first plurality of twinax cables adjacent to each other such that the pairs of conductors in the twinax cables align along a lateral direction defining the first twinax cable set;
   forming at least another twinax cable set using the step of forming the first twinax cable set, the first and at least another twinax cable set having opposite cable end sections and a lacing section between the cable end sections, where the twinax cables extend at each cable end section to connector ends;
   fastening the first twinax cable set and the at least another twinax cable set using a first tie-bar between the lacing section and the connector ends of the twinax cables in the first twinax cable set and the at least another twinax cable set, where the twinax cable sets are fastened in the tie bar in a first order at a first assembly end section of the twinax cable assembly;
   lacing the twinax cables of the twinax cable sets in the lacing section of the twinax cable sets maintaining the conductor pairs in each of the twinax cables of each twinax cable set aligned in the lateral direction;
   re-forming the first twinax cable set and the at least another twinax cable set at a second assembly end section using the forming step used to form the first twinax cable set at the first assembly end section; and
   fastening the first twinax cable set and the at least another twinax cable set using a second tie-bar between the lacing section and the connector ends at the second assembly end section of the twinax cable assembly, where the twinax cable sets are fastened in a second order different from the first order, where the second order is defined by the lacing of the twinax cables.

17. The method of claim 16 further comprising:
   binding the first twinax cable set and the at least another twinax cable set by wrapping each of the first twinax cable set and the at least another twinax cable set at each end section with a binder to fix the twinax cables in each of the first twinax cable set and the at least another twinax cable set with the pairs of conductors aligned in the lateral direction of each of the first twinax cable set and the at least another twinax cable set, where the first twinax cable set and the at least another twinax cable set are configured to bend around a bend axis in the lateral direction with the pairs conductors aligned in the lateral direction.

18. The method of claim 16 further comprising:
   connecting the pair of conductors at the connector ends of each twinax cable set to a printed circuit board in a row of connections substantially in parallel with the row of connections at which the connector ends of a next twinax cable set connects to the printed circuit board.

19. The method of claim 16 further comprising:
   terminating the first assembly end section of the twinax cable assembly at connections to a first printed circuit board and the second assembly end section at connections to a second printed circuit board.

20. The method of claim 16 further comprising in the fastening step at the first assembly end section and the second assembly end section:
   stacking the twinax cable sets in the first order at the first assembly end section and in the second order different from the first order at the second assembly end section.

21. The method of claim 20 further comprising:
   lacing the twinax cable sets such that the second order of twinax cable sets is in reverse of the first order.

* * * * *